April 26, 1927. 1,626,215
C. G. STRANDLUND
CULTIVATOR
Filed March 20, 1922 6 Sheets-Sheet 1
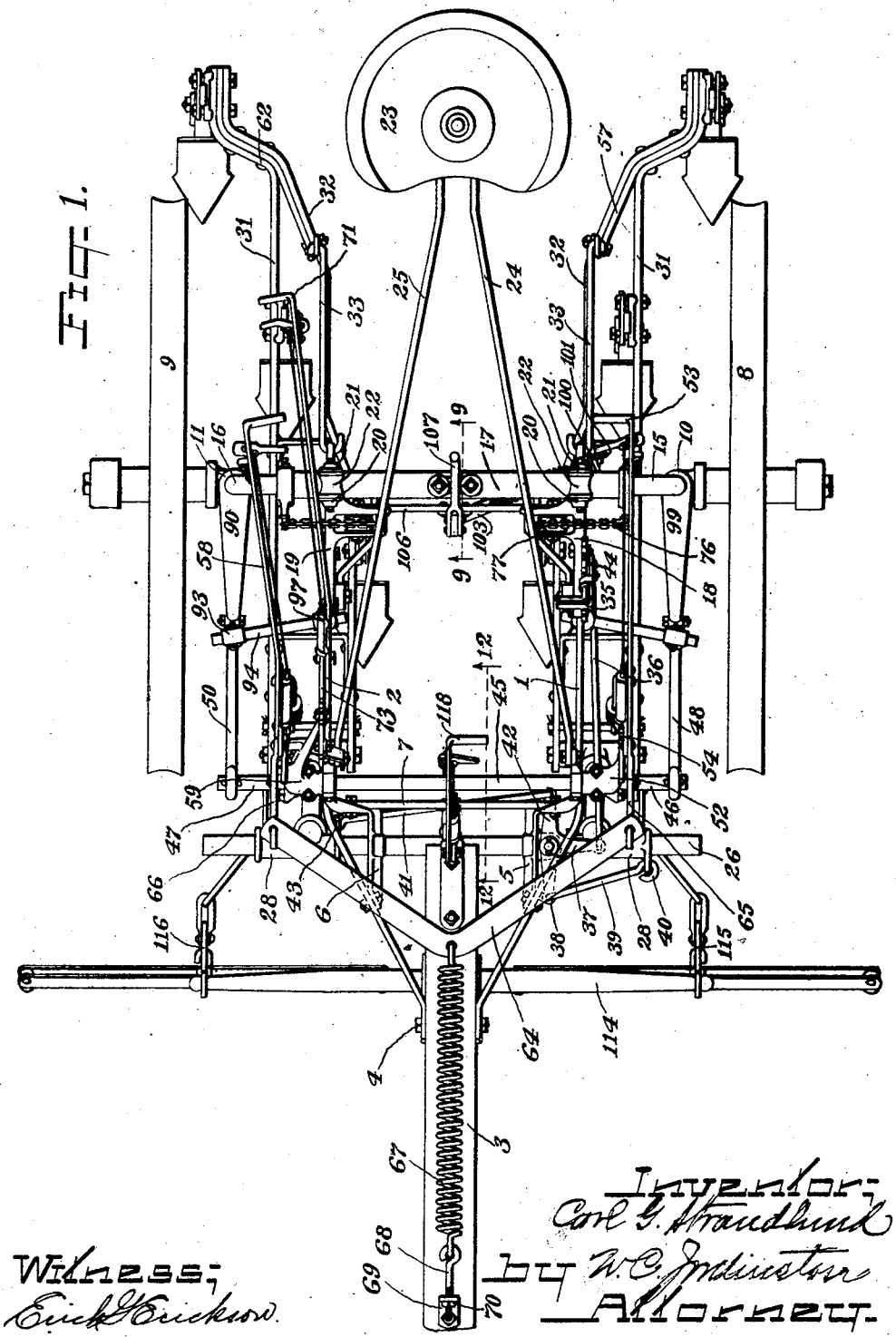

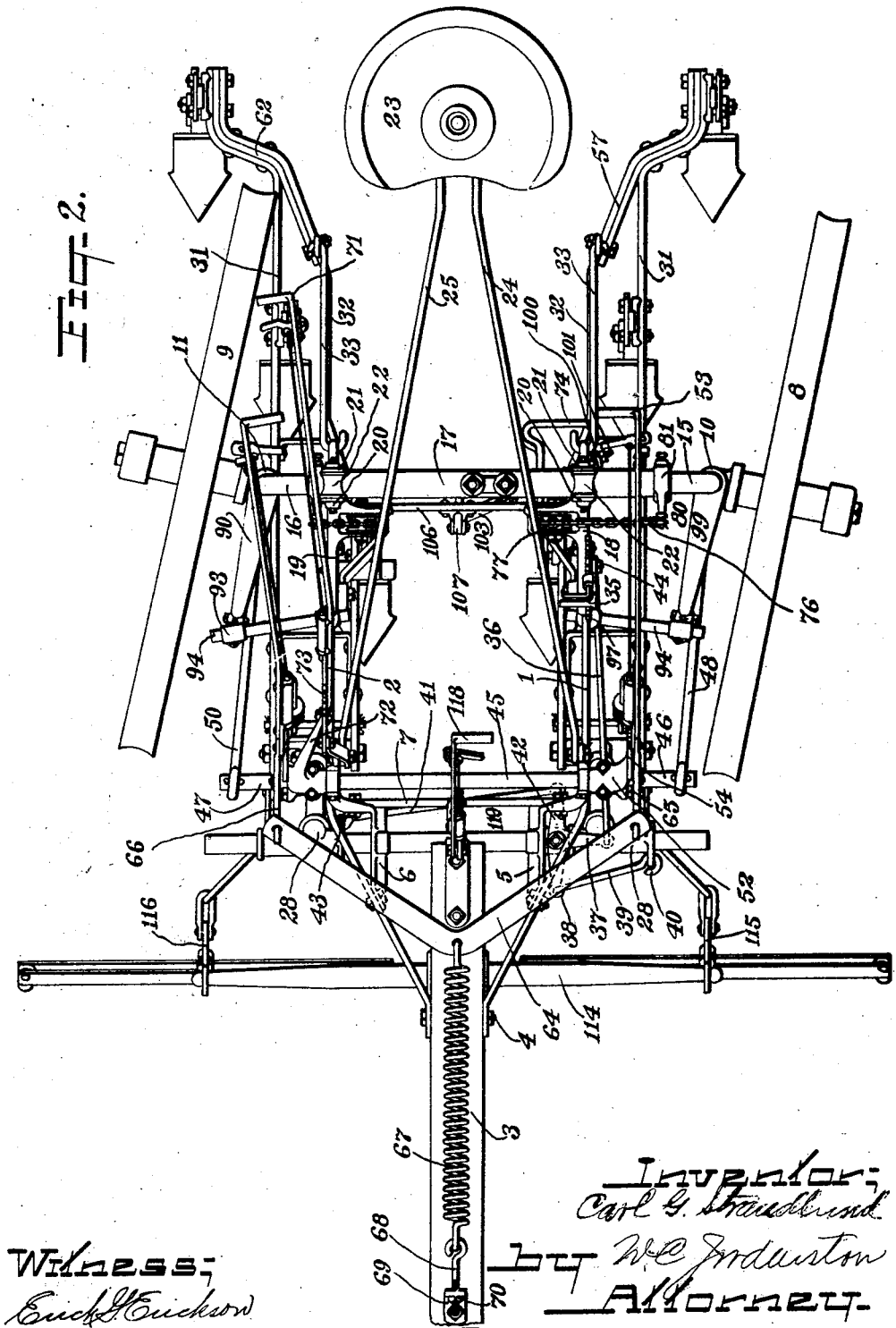

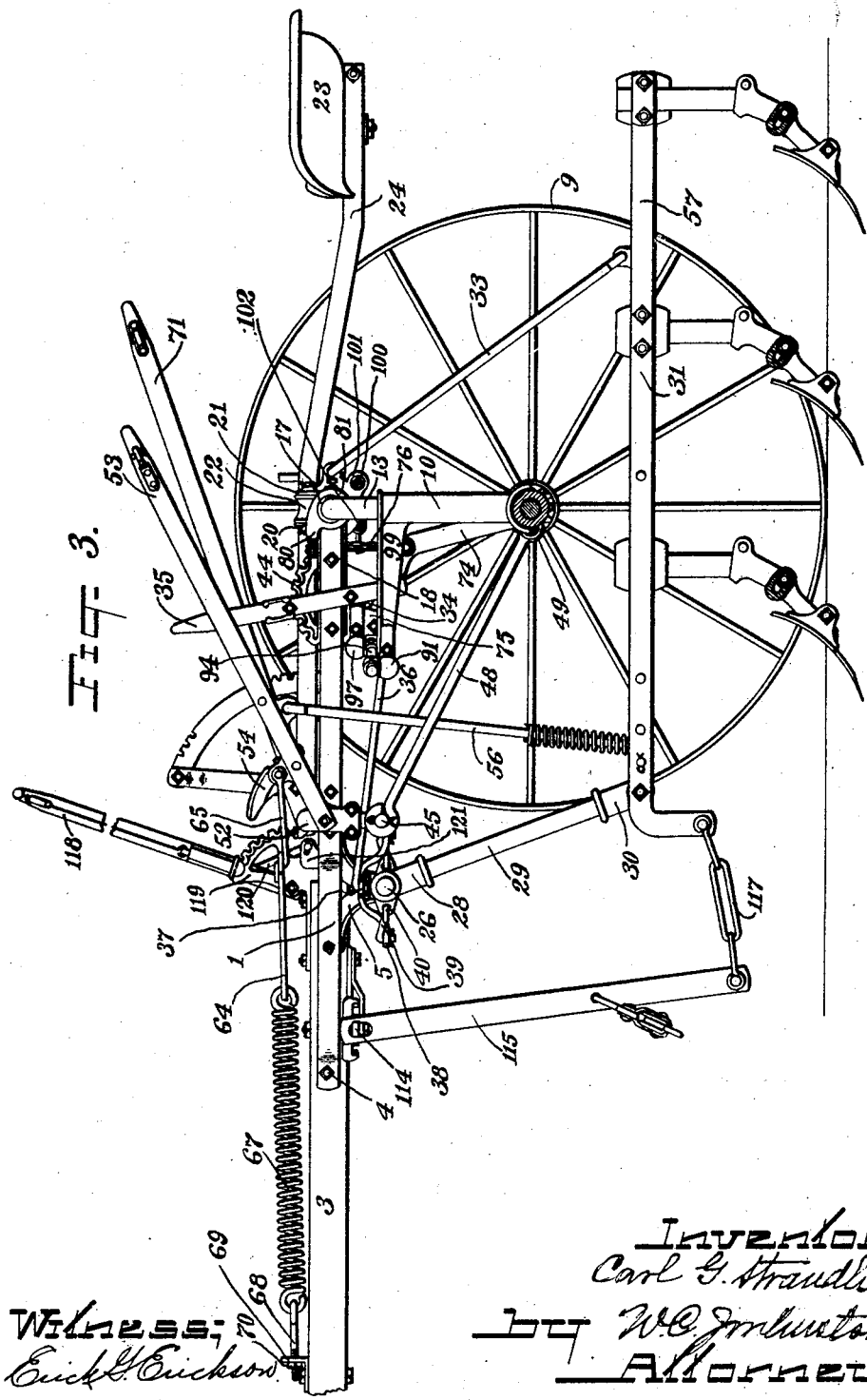

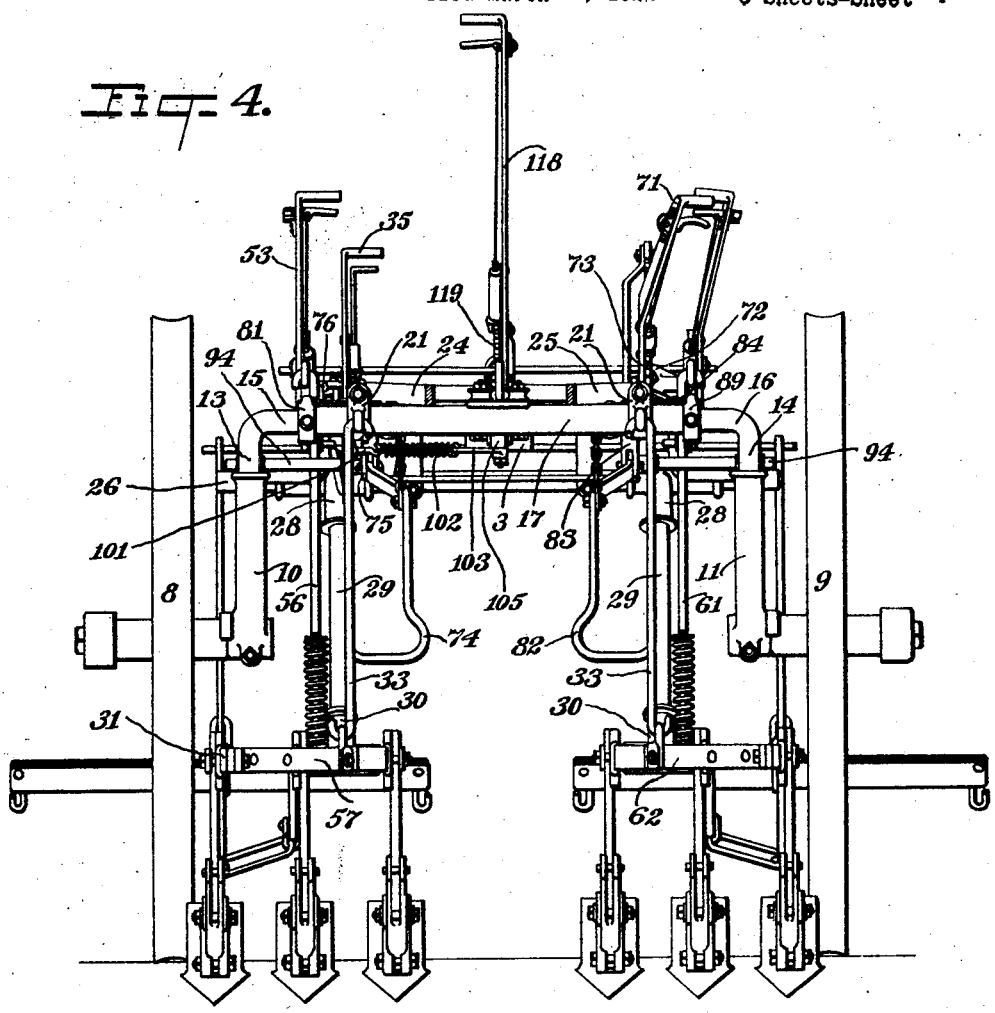

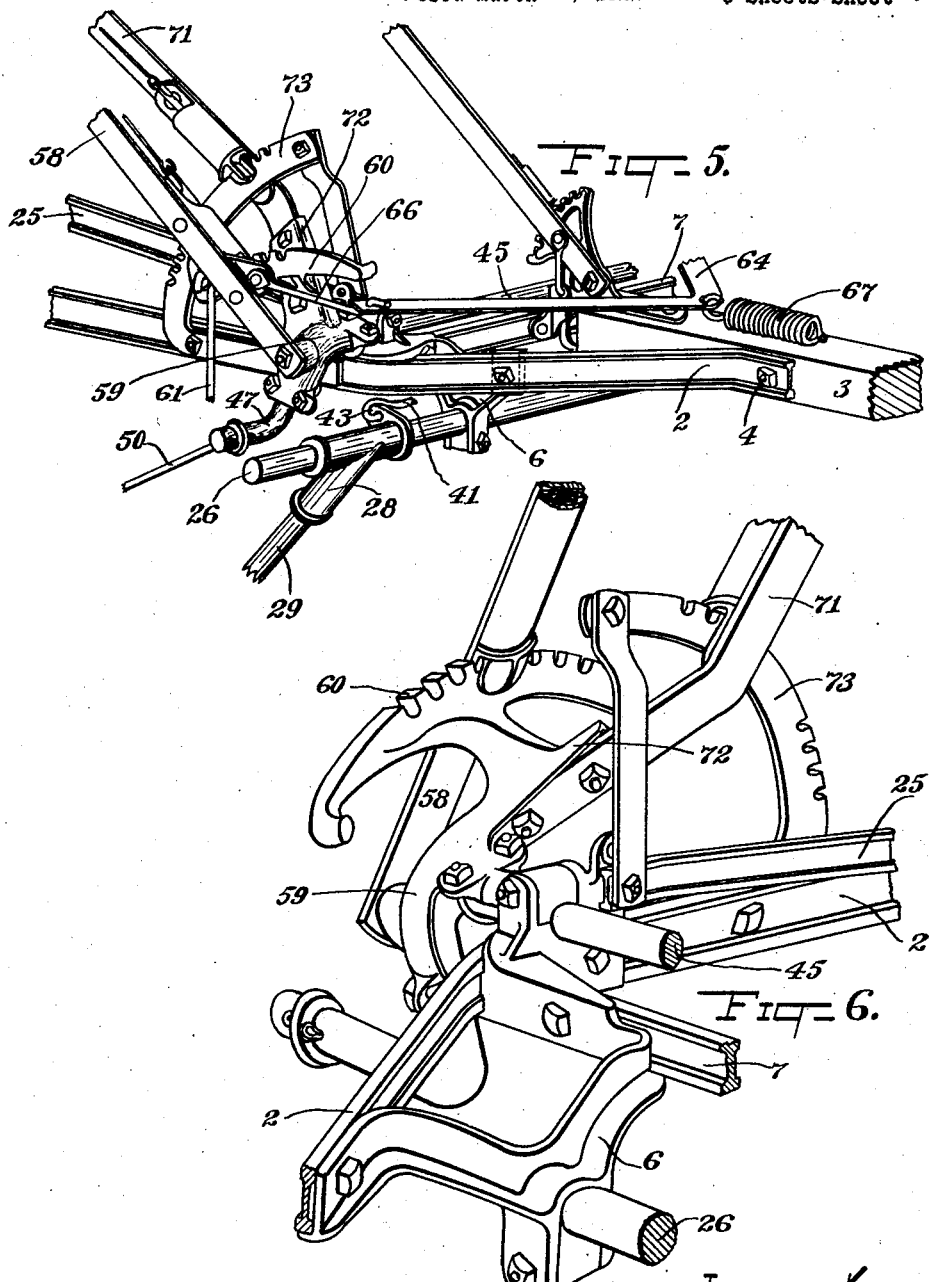

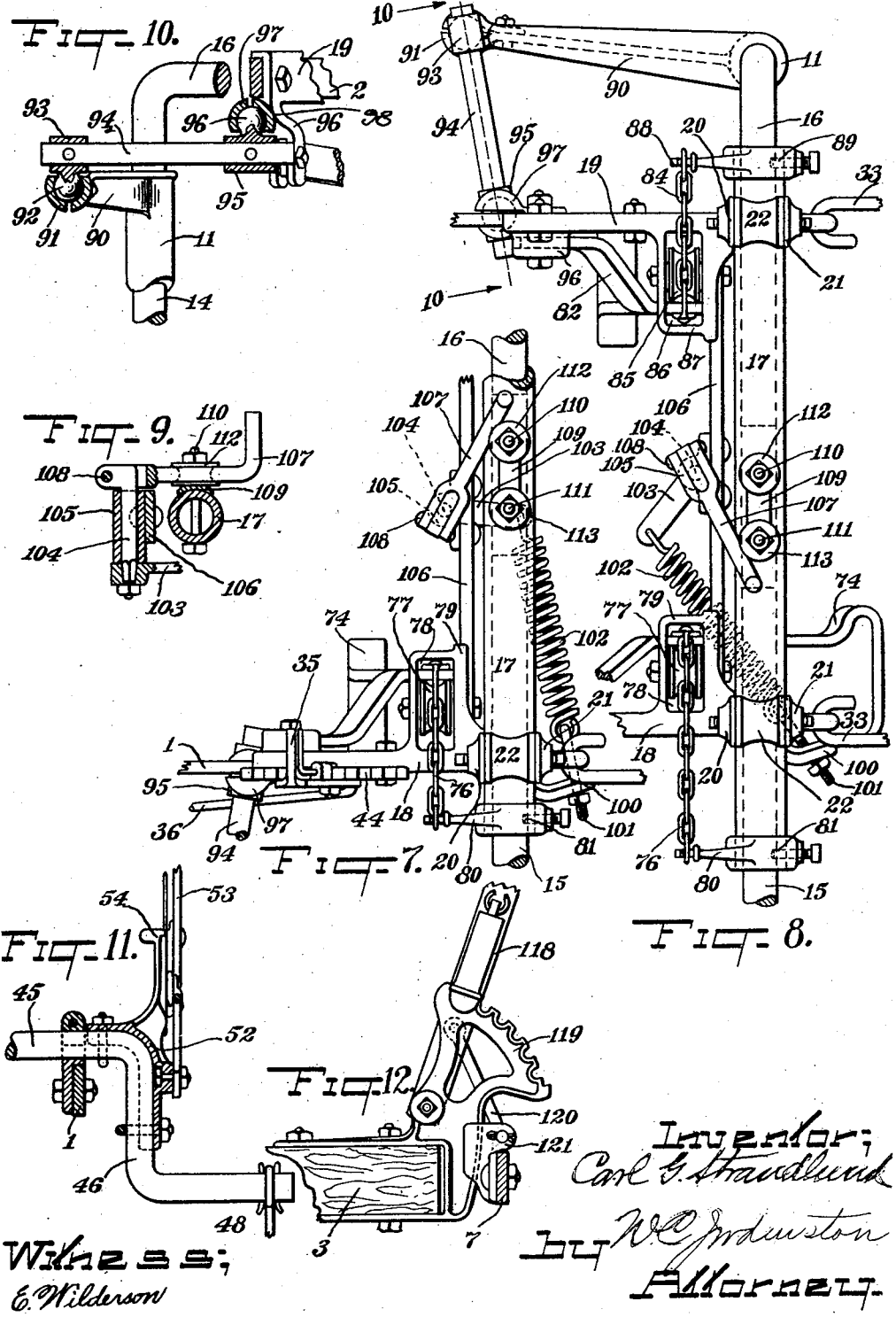

Patented Apr. 26, 1927.

1,626,215

UNITED STATES PATENT OFFICE.

CARL G. STRANDLUND, OF MOLINE, ILLINOIS, ASSIGNOR TO DEERE & COMPANY, OF MOLINE, ILLINOIS, A CORPORATION OF ILLINOIS.

CULTIVATOR.

Application filed March 20, 1922. Serial No. 544,996.

My invention relates to cultivators of the wheeled type, and has for an object to simplify the construction and operation and to perfect the various features of adjustment. A further object is to provide means by which the operator has a fixed position relative to the cultivating rigs irrespective of their lateral adjustment to follow irregularities in the rows of plants. Other objects will be apparent in the following specification.

Referring to the drawings in which similar numerals indicate identical parts.

Figure 1 is a plan view of a cultivator embodying my improvements. Figure 2 is a similar view showing the rigs shifted to the right and the wheels steering in that direction. Figure 3 is a side elevation of Figure 1 with the near wheel removed. Figure 4 is a rear elevation with the cultivating devices in the ground and the seat omitted. Figure 5 is a fragmentary view in perspective showing the construction of part of the lever control. Figure 6 is a fragmentary view in perspective illustrating one of the brackets to which parts of the frame are secured, and on which various of the operating parts are mounted. Figure 7 is an enlarged detail view of the device for control of the rigs when operating on a side hill. Figure 8 is a view in part similar to Figure 7 but with the parts in a different position. Figure 9 is a detail section on the line 9—9 of Figure 1. Figure 10 is a detail section on the line 10—10 of Figure 8. Figure 11 is a fragmentary view in part section showing one of the lever mountings, and Figure 12 is a detail section on the line 12—12 of Figure 1.

The main frame consists of bars 1 and 2 bent intermediate their length to converge forwardly to a pole or tongue 3 to which they are secured by a bolt 4. A casting 5 is mounted on the bar 1, at the bend thereof, and a similar casting 6 is mounted on the bar 2. Bolted to both castings is a transverse bar 7 adding to the rigidity of the frame. Supporting wheels 8 and 9 are mounted on horizontal spindles secured in the lower part of vertical sleeves 10 and 11. The vertical sleeves 10 and 11 are rotatably mounted on spindles 13 and 14 of an arch axle composed of parts 15 and 16 and a tubular member 17 in which horizontal portions of the parts 15 and 16 are rockably journaled, as shown by dotted lines in Figures 7 and 8. The rear ends of the frame bars 1 and 2 are rigidly attached to brackets 18 and 19, which are provided with arms 20 and 21 extending vertically above the member 17 and on opposite sides thereof, and supported between the arms 20 and 21 on both brackets are rollers 22 supporting the rear end of the frame on the member 17 and rolling on the latter in the lateral adjustment of the frame. A seat 23 is supported on bars 24 and 25 pivotally connected to the castings 5 and 6 and resting on the member 17.

Supported in bearings on the castings 5 and 6 is a round bar 26 carrying at each end a T coupling 28 slidable thereon and secured to depending bars 29 having T couplings 30 on their lower ends pivotally mounted between bars 31 and 32 of the frame carrying cultivating devices of the desired type. Pivotally connected to the rearward parts of the bars 31 are links 33 extending upwardly substantially parallel with the bars 29 and pivotally attached to the brackets 18 and 19. The bracket 18 has a projection 34, below the frame bar 1, on which a lever 35 is pivotally supported intermediate its ends. A link 36 is attached to the lever 35, at the lower end of the latter, and extends forwardly to connection with an arm 37 of a bell crank pivotally mounted on the casting 5. To an arm 38 of the bell crank is connected a link 39 which extends to an eye 40 on one of the T couplings 28. A similar link 41 is connected to the arm 42 of the bell crank and to an eye 43 on the other T coupling 28. From the construction just described it will be seen that by rocking the lever 35 the bell crank will be operated, and through the links 39 and 41 the couplings 28 will be moved toward or from each other and consequently the cultivating rigs will be swung according to the width of cultivation desired and held in any adjusted position by a latch, of the usual type, on the lever 35 engaging a notched sector 44 preferably integral with the bracket 18.

Journaled in bearings in the castings 5 and 6 is a rock shaft 45 having crank 46 at one end and a similar crank 47 at the opposite end; a rod 48 is pivotally connected to the crank 46 and extends rearwardly and downwardly to an eye 49 on the lower part of the sleeve 10, and a similar rod 50 is connected to the crank 47 and to an eye 51 on the sleeve 11, not shown. Rigidly secured on the crank 46 is a casting 52 on which is pivotally mounted a lever 53 having a latch, of the usual type, to engage with a curved rack 54 preferably integral with the casting 52. Attached to the lever 53, intermediate its length, is an eye in which is engaged the hook end of a depending rod 56 having its lower end connected to the cultivating rig 57.

A similar lever 58 is mounted on a casting 59, on the crank arm 47, and has a latch to engage with a curved rack 60. A depending rod 61 is secured on the lever 58, intermediate the ends of the latter, and has its lower end attached to the cultivating rig 62. A horizontally disposed yoke 64 is connected to the levers 53 and 58 by links 65 and 66, and attached to the centre of the yoke 64 is a coiled spring 67 which extends forwardly to connection with a hook bolt 68 having its forward end threaded and projected through a hole in a bracket 69 mounted on the pole 3. A nut 70 on the threaded end of the bolt 68 holds the latter in place and is operable to vary the tension of the spring 67.

The rig 57 can be readily raised or lowered by operation of the lever 53 through the connecting rod 56, the tension of the coiled spring 67 materially aiding in raising the rig. The rig 62 is raised or lowered in a similar manner by operation of the lever 58.

By the construction and operation of the parts just described, it is apparent that the cultivating rigs are vertically movable independently of each other, but as it is often desirable to raise or lower both rigs simultaneously I employ a master lever 71 which is rigidly mounted on an arm 72 extending from the casting 59, and preferably integral therewith, and is provided with the usual latch to engage with a notched quadrant 73 secured to the casting 6 and to the frame bar 2. When the master lever 71 is operated and both rigs are raised, the shaft 45 is rocked and simultaneously, through the rods 48 and 50, the arch axle is rocked forward on the wheel spindles to utilize the weight of the operator in raising the rigs.

A foot lever 74 is pivotally mounted on a downwardly extending part 75 of the bracket 18, and intermediate its ends is connected a chain 76 which passes upwardly over a sheave 77, mounted in a slot 78 of a laterally extending part 79 of the bracket 18, and is attached to an arm 80 on a collar 81 rigidly secured on the adjacent end of the tubular member 17. A similar foot lever 82 is pivotally mounted on a downwardly projecting part 83 of the bracket 19, and intermediate its ends is attached a chain 84 which leads upwardly and over a sheave 85 supported in a slot 86, in a laterally extending part 87 of the bracket 19, and connected to an arm 88 on a collar 89 rigidly secured on the adjacent end of the tubular member 17. The foot levers 74 and 82 are operable to move the frame and rigs bodily to the right or left as may be desired, and in order to simultaneously steer the wheels 8 and 9 in the direction of the movement of the frame I provide an arm 90, preferably integral with the upper end of the sleeve 11, and having secured on its forward end a split casting 91 with a globular socket to receive a ball 92. The ball 92 is part of a sleeve 93 rigidly fastened on an end of a link 94 which extends laterally toward the frame bar 1 and adjacent thereto is provided with a sleeve 95, rigidly secured on the link 94, and having a ball 96 seated in a globular socket in a split casting 97 mounted on a depending part 98 of the bracket 19. An arm 99 is similarly provided on the sleeve 10 and is connected in a similar manner to the frame bar 1; by this construction it is evident that as the frame and rigs are moved laterally the wheels 8 and 9 are readily swung in the direction of the frame movement.

When cultivating on a slope or hill side I have found it necessary that some provision be made to prevent the machine from edging away from the line of cultivation across the slope, I therefore have, preferably integral with the bracket 18, an arm 100 to which is secured an eye bolt 101; one end of a coiled spring 102 is attached to the eye bolt 101, and extends to connection with a lever arm 103 rigidly mounted on the lower end of a vertical spindle 104 rotatably journaled in a bearing 105 fastened to a bar 106 midway the length thereof. The bar 106 is parallel with the tubular member 17 and is rigidly secured to the parts 79 and 87 of the brackets 18 and 19. The upper end of the spindle 104 is flattened to fit in the bifurcated end of a dog 107 which is rockable on a horizontal bolt 108 securing the dog and spindle together. Centrally of the length of the tubular member 17 is a plate 109 secured on the member 17 by bolts 110 and 111; the upper ends of the bolts 110 and 111 operate as spindles upon which are respectively journaled rollers 112 and 113 spaced apart sufficiently for the reception of the dog 107 between them.

Normally, in the mechanism just described, the dog 107 is swung forwardly on its pivot 108, the wheels are then controlled by the foot levers 74 and 82. As shown in Figure 1 the dog 107 is between the rollers 112 and 113 and when in this position the tension of the coiled spring 102 is neutral, that is, that the spring 102 is operating to hold the wheels parallel to the line of draft and the frame substantially equidistant from the wheels; if, however, the machine is cultivating on a slope or hill side, with the grade to the right of the operator, by swinging the lever to the right of the roller 112 the tension of the spring 102 is of sufficient strength to counteract the tendency of the machine to move to the left, or downhill, and if the slope is to the left of the operator the dog is swung to the left of the roller 113 with the same result in withstanding the inclination of the machine to steer downhill; but by swinging the dog 107 upwardly and forwardly, pivoting on the bolt 108. so that it will not be in contact with either of the rollers 112 and 113, the lateral adjustment of the frame and simultaneous steering of the wheels is accomplished solely by operation of the foot levers without the assistance of the spring 102.

The draft mechanism comprises a doubletree 114 mounted on the pole 3 and having depending bars 115 and 116 connected respectively to the rigs by chains 117. The pole is adjustable vertically, swinging on the bolt 4, by operation of a lever 118 which is pivotally mounted on a notched sector 119, rigidly fastened to the pole; the lever 118 is connected by a link 120 to a casting 121 bolted to the transverse bar 7 of the main frame, so that by a rocking movement of the lever 118 the forward end of the pole 3 can be raised or lowered as may be desired.

I have shown and described a compact efficient machine, provided with means for the various adjustments required to accommodate the conditions of cultivation, and materially strengthened by substituting solid castings 5 and 6, rigidly mounted on the frame, for numerous parts that have heretofore been employed.

What I claim is—

1. In a cultivator, the combination with an arch axle and dirigible wheels, of a frame movably supported on the axle, foot levers pivotally supported on the frame, and connections from said levers to the axle, said levers operable to move the frame laterally and simultaneously steer the wheels in the same direction.

2. In a cultivator, the combination with an arch axle and dirigible wheels, of a frame having a rolling support on the axle, means operable to move said frame laterally, a connection between each wheel and the adjacent side of the frame whereby said wheels are steered simultaneously with the lateral movement of the frame and in the same direction.

3. In a cultivator, the combination with an arch axle, of a frame including side bars, a bracket on each side bar having a roller support on the axle, means operable to move the frame laterally, and means connecting said frame and wheels whereby the latter are steered simultaneously with the lateral movement of the frame and in the same direction.

4. In a cultivator, the combination with an arch axle, of a frame including side bars, a bracket on each side bar having a roller support on the axle, foot levers operable to move the frame laterally and means connecting said frame and wheels whereby the latter are steered simultaneously with the lateral movement of the frame and in the same direction.

5. In a cultivator, the combination with an arch axle having vertical spindles, a sleeve rotatably mounted on each spindle and having a horizontal spindle, wheels journaled on the horizontal spindles, an arm extending forwardly from each sleeve, a frame having a rolling support on the axle, means to move the frame laterally on the axle, and links flexibly connected to each arm and with the frame, whereby as the frame is moved laterally the wheels are simultaneously steered in the same direction.

6. In a cultivator, the combination with an arch axle having vertical spindles, a sleeve rotatably mounted on each spindle and having a horizontal spindle, wheels journaled on the horizontal spindles, an arm extending forwardly from each sleeve, a frame having a rolling support on the axle, links flexibly connected to each arm and with the frame, and foot levers operable to move the frame laterally and to simultaneously steer the wheels in the same direction.

7. In a cultivator, the combination with an arch axle having vertical spindles, a sleeve rotatably mounted on each spindle and having a horizontal spindle, wheels journaled on the horizontal spindles, an arm extending forwardly from each sleeve, a frame including side bars, brackets on the side bars, rollers journaled on said brackets and movable on the axle, link connections from said arms to the brackets, and foot levers pivotally mounted on the brackets and operable to move the frame laterally and simultaneously steer the wheels in the same direction.

8. In a cultivator, the combination with an arch axle having vertical spindles, a sleeve rotatably mounted on each spindle and having a horizontal spindle, wheels journaled on the horizontal spindles, an arm extending forwardly from each sleeve, a frame, brackets rigidly secured on said frame and having a rolling support on the axle, link connections from said arms to the brackets, foot levers pivotally mounted on the brackets, sheaves on the brackets, chains connected to said levers intermediate their ends and leading over said sheaves to fastenings on the axle, whereby the frame is moved laterally on said axle by the operation of said levers and the wheels are simultaneously steered in the same direction.

9. In a cultivator, the combination with an arch axle and dirigible wheels, of a frame movably supported on said axle and normally in a position substantially equidistant from the wheels, means operating to hold the frame in said position, and means operable to move the frame laterally on said axle and simultaneously steer the wheels in the direction of movement of the frame when said holding means is released.

10. In a cultivator, the combination with an arch axle and dirigible wheels, of a frame movably supported on said axle and normally in a position substantially equidistant from the wheels, means operating to hold the frame resiliently in said position, and means operable to move the frame laterally on said axle and simultaneously steer the wheels in the direction of movement of the frame when said holding means is released.

11. In a cultivator, the combination with an arch axle and dirigible wheels, of a frame movably supported on said axle and normally in a position substantially equidistant from the wheels, a bar rigid with the frame and adjacent the axle and parallel therewith, means on said bar co-operating with means on the axle to hold the frame in said position, and means operable to move the frame laterally on said axle and simultaneously steer the wheels in the direction of movement of the frame when said holding means is released.

12. In a cultivator, the combination with an arch axle and dirigible wheels of a frame movably supported on said axle and normally in a position substantially equidistant from the wheels, a bar rigid with the frame and adjacent the axle and parallel therewith, a dog carried on said bar and co-operating with means on the axle to hold the frame in said position and means operable to move the frame laterally on said axle and simultaneously steer the wheels in the direction of movement of the frame when said holding means is released.

13. In a cultivator, the combination with an arch axle and dirigible wheels, of a frame movably supported on the axle and normally in a position equidistant from the wheels, a bar rigid with the frame and adjacent and parallel to the axle, and spring controlled means on the bar adjustably co-operating with means on the axle to resiliently resist a lateral movement of the frame on the axle.

14. In a cultivator, the combination with an arch axle and dirigible wheels, of a frame movably supported on the axle and normally in a position substantially equidistant from the wheels, a bar rigid with the frame and adjacent and parallel to the axle, a dog pivotally supported on said bar, a spring connected with said dog and the frame, and stops on the axle with which said dog is adapted to be engaged at will, whereby the tension of said spring is exerted to resist a lateral movement of the frame on the axle.

15. In a cultivator, the combination with an arch axle and dirigible wheels, of a frame movably supported on the axle and normally in a position substantially equidistant from the wheels, a bar rigid with the frame and adjacent and parallel to the axle, a dog pivotally supported on said bar, a coiled spring connected with said dog and the frame, a stop on the axle with which said dog is adapted to be engaged at will whereby the tension of the spring is exerted to resist a lateral movement of the frame in one direction, and a similar stop with which said dog is adapted to be engaged at will whereby the tension of the spring is exerted to resist a lateral movement of the frame in the opposite direction.

CARL G. STRANDLUND.